Nov. 4, 1924.                                                1,514,340
                    R. L. RICE, SR., ET AL
               LIQUID SPREADER FOR WINDSHIELDS
               Filed June 10, 1922        2 Sheets-Sheet 2
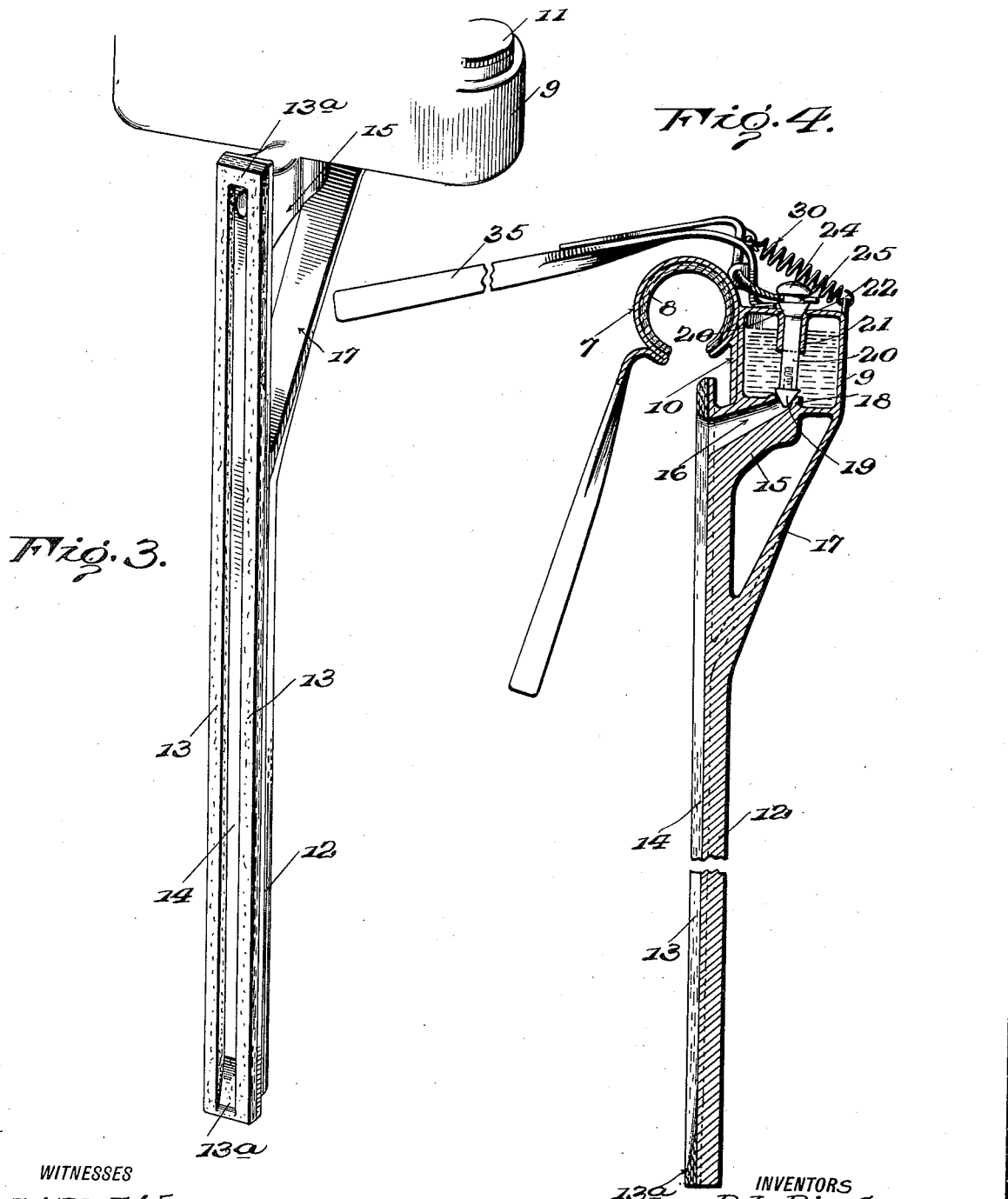
INVENTORS
R. L. Rice Sr.
W. M. Jordan
BY
ATTORNEYS
WITNESSES Patented Nov. 4, 1924.

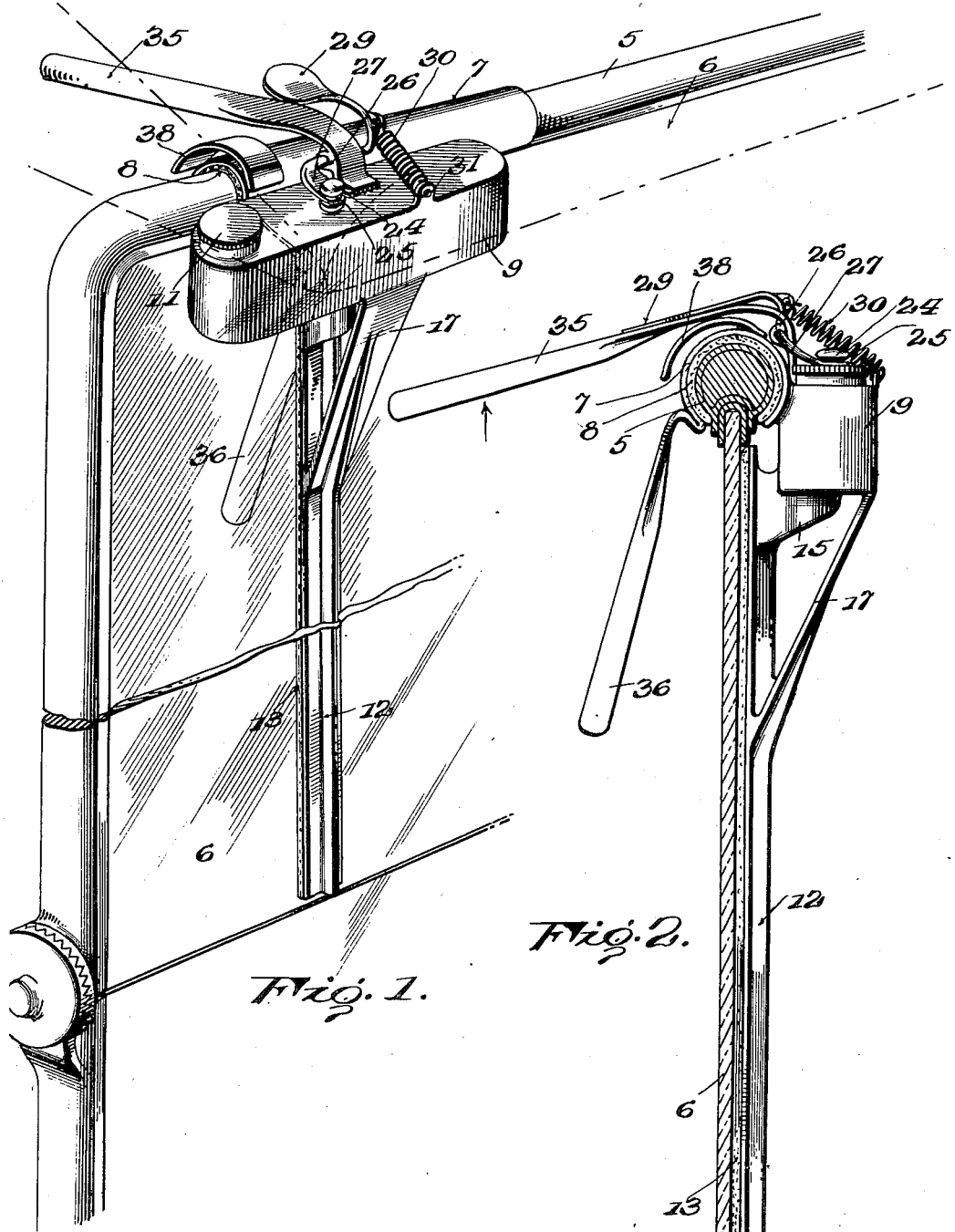

1,514,340

UNITED STATES PATENT OFFICE.

ROBERT LAWRENCE RICE, SR., AND WILLIAM MARTIN JORDAN, JR., OF HOVEY, MISSISSIPPI.

LIQUID SPREADER FOR WINDSHIELDS.

Application filed June 10, 1922. Serial No. 567,476.

*To all whom it may concern:*

Be it known that we, ROBERT L. RICE, Sr., and WILLIAM MARTIN JORDAN, Jr., citizens of the United States, and residents of Hovey, in the county of Harrison and State of Mississippi, have invented certain new and useful Improvements in Liquid Spreaders for Windshields, of which the following is a specification.

This invention relates to a liquid spreader for use with wind shields or the like of automobiles or other vehicles.

The object of the invention is to provide a device of this character which will remove mist, rain, sleet, snow or the like from the wind shield and spread thereover a transparent liquid which serves to prevent further deposit of mist, rain, snow or sleet upon the glass, thereby insuring a clear and unobstructed vision and enabling the operator to safely conduct or control the vehicle.

Another object is to provide a device of this character which is of extremely simple and durable construction, reliable and convenient in operation, attractive in appearance and easy and comparatively inexpensive to manufacture and apply.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, illustrating the invention applied to a wind shield of an automobile or the like;

Figure 2 is a view, partly in section and partly in elevation, illustrating the device in use on a wind shield;

Figure 3 is a fragmentary detail perspective view, illustrating the construction of the wiper and spreader arm; and Figure 4 is a detail view in vertical section.

Referring to the drawings it will be seen that for the purpose of illustration, the invention is shown in conjunction with the wind shield of an automobile, the frame of which is designated at 5 and the glass of which is designated at 6. The liquid spreader and wiper which constitutes the present invention comprises a carrier which consists of a split sleeve 7 constructed of resilient sheet metal and so shaped as to snugly embrace the top portion of the frame 5 as shown in Figures 1 and 2, the split sleeve having a lining 8 of felt whereby it frictionally engages the wind shield frame without tending to mar or otherwise injure the same.

A reservoir 9 is supported upon the carrier in any suitable manner as for instance by means of an attaching plate 10 integral with or suitably secured to the split sleeve and also suitably secured to the reservoir. The carrier plate may be secured to the split sleeve and to the reservoir by welding, soldering or in any other desired manner. The reservoir 9 is adapted to contain a liquid which when applied to the wind shield will prevent or tend to prevent deposits of rain, sleet, snow or the like thereupon, the liquid being transparent so that when applied to the wind shield it will insure for the driver of the vehicle a clear and unobstructed vision thereby enhancing his capacity to properly and safely control the vehicle. A filling plug 11 provides for the renewal of the supply of liquid in the reservoir.

A combined wiper and spreader arm 12 is provided and preferably comprises an elongated piece of metal of T-shaped cross section depending from the reservoir and having parallel strips of felt 13 extending along and secured to one face thereof, the strips of felt defining a channel 14, the ends of which are closed by transverse strips of felt, designated at 13ª and integrally formed with the longitudinal strips 13. The strips of felt are adapted to directly engage and bear against the glass of the wind shield, as clearly shown in Figure 2. A connection 15 is provided between the reservoir and the combined wiper and spreader arm and may be suitably secured to the combined wiper and spreader arm and the tank. A passage or duct 16 is provided in the connection and affords communication between the reservoir and the channel 14. A brace 17 extends between the reservoir and the arm 12 and with the connection 15 serves to rigidly connect the wiper arm to the reservoir.

At the point where the duct or passage 16 communicates with the interior of the reservoir there is provided a valve seat 18 with which a valve 19 carried by the lower end of the valve stem 20 coacts to control the flow of the liquid from the reservoir through the duct and into the channel. The valve stem 20 is slidably fitted in the valve guide 21 depending from the top of the reservoir and the top of the reservoir above the valve guide is provided with a valve seat 22 with which a second valve 23 carried by the valve stem coacts to prevent leakage from the reservoir should the same be turned up side down. A head 24 is formed at the upper end of the valve stem 20 and is provided with an annular groove 25.

Operating means is provided for the valve and preferably comprises a rocker 26 rotatably mounted in a suitable bearing provided therefor and provided with a crank arm 27 having its outer end bifurcated or yoked, the arms of the yoke being received in the annular groove 25 of the head 24 of the valve stem 20. At the end opposite the crank arm 27 the rocker has integrally formed therewith an annular finger piece 29. A rectractile coil spring 30 has one end connected to the finger piece and its opposite end connected to a lug 31 rigidly secured to the reservoir and is tensioned to swing the rocker to such position as to maintain the valves 19 and 23 closed.

A fixed or rigid operating arm 35 is rigidly connected to the reservoir and extends rearwardly therefrom and over the carrier, the arm 35 being disposed in substantially a horizontal plane. A movable operating arm 36 is rigidly connected with the movable portion of the split sleeve. In this connection it is to be noted that the portion of the split sleeve which is connected to the reservoir is substantially rigid whereas the portion thereof remote from the reservoir is, by virtue of the resiliency of the metal from which the sleeve is constructed, resilient or flexible to a certain extent. Thus when the operator grasps the levers 35 and 36 and draws the lever 36 upwardly, the sleeve 7 is opened in that a portion of it is flexed outwardly and out of engagement with the frame of the wind shield. At such time, the device may be shifted transversely of the wind shield to cause the wiper and spreader to traverse the glass thereof. In order to preclude the operator from flexing the split sleeve beyond the elastic limits of the metal which constitutes it, a stop 38 is provided and preferably takes the form of an arcuate plate having one end rigidly secured to the rigid portion of the split sleeve and arranged so as to be engageable with the flexible portion of the split sleeve. As soon as the arm 36 is released, the split sleeve springs back into engagement with the frame of the wind shield and grasps the same to retain the device in position. While the device is being shifted back and forth across the wind shield the operator may with the same hand depress the finger or thumb piece 29 so as to open the valve 19 and permit liquid to flow through the passage 16 into the channel 14 from whence it is spread over the surface of the glass. The strips of felt 13 serve to wipe the glass and also to define the channel through which the liquid flows and from which it is spread or distributed over the surface of the glass. As soon as the operator releases the pressure on the finger or thumb piece 29 the retractile coil spring is at once effected to close the valves 21 and 23.

Preferably the metal of the device is nickel plated so as to give it an attractive and ornamental appearance. It is to be understood also that various changes in the size, shape, construction and arrangement of parts may be made without departing from the spirit of the invention and the scope of the subjoined claims.

We claim:

1. In a wiper and liquid spreader for use with wind shields, a carrier comprising a split sleeve of resilient metal adapted for releasable engagement with the frame of a wind shield, a reservoir supported upon said sleeve, a combined wiper and spreader arm depending from the reservoir, strips of felt carried by the arm and defining a channel, a connection between the arm and the reservoir, said connection having a passage affording a passage between the reservoir and the channel of said arm, means for releasing the sleeve from gripping engagement with the wind shield to facilitate movement of said device, and manually controlled valve means for regulating the flow of liquid from the reservoir to the channel of the arm.

2. In a liquid spreader for use with wind shields, a carrier comprising a split sleeve of resilient metal, a reservoir supported upon a portion of said sleeve, the portion of said sleeve to which said reservoir is connected constituting a rigid portion and the opposite portion of said sleeve constituting a flexing portion, a spreader arm depending from the reservoir and having a channel communicating therewith, valve means controlling the flow to said channel, a rigid operating arm connected to the reservoir and an operating arm connected with the flexible portion of the split sleeve and cooperable with the rigid operating arm for releasing gripping engagement of the sleeve with the wind shield frame to facilitate gripping of the device.

3. In a device of the character described, a split sleeve, a reservoir supported thereupon, a spreader arm depending from the reservoir and connected thereto, a brace between the spreader arm and the reservoir, a rigid operating arm connected with the reservoir, a cooperable movable operating arm connected with the split sleeve and manually operable valve means controlling the flow of lubricant from the reservoir to the spreader arm.

4. In a device of the character described, a carrier, a reservoir supported thereupon, a spreader arm connected with the reservoir, a valve controlling the flow of liquid from the reservoir, and operating means for the valve including a rocker having a crank arm provided with a bifurcated end cooperable with the valve, said rocker arm also having a finger piece extending angularly therefrom, and a spring cooperable with the finger piece for swinging the rocker to such position as to close the valve.

5. In a device of the character described, a carrier, a reservoir supported thereupon, a spreader arm having a channel, a connection between the spreader arm and the reservoir, said connection having a passage affording communication between the reservoir and the spreader arm, said reservoir having a valve seat at the point where it communicates with the passage of the connection, a valve cooperable with said seat and having a valve stem extending up through the reservoir, said reservoir having a second valve seat in its top, a second valve carried by the valve stem and cooperable with said second valve seat, operating means for said valve, and spring means for maintaining said valve in closed position.

6. In a device of the character described, a split sleeve of resilient metal, a lining of felt for said split sleeve, a reservoir carried by the split sleeve, a spreader arm depending from the split sleeve, valve means for controlling the flow of liquid from the reservoir to the spreader arm, means cooperable with the split sleeve for shifting the device, and operating means for said valve.

7. In a device of the character described, a split sleeve of resilient metal, a reservoir supported upon said split sleeve, a spreader arm depending from the reservoir and connected therewith, a valve controlling the flow of liquid from the reservoir to the spreader arm, a pair of arms for shifting said device, one of said arms being connected to said reservoir and the other of said arms being connected to the split sleeve, and operating means for the valve including a finger piece arranged adjacent one of said operating arms.

ROBERT LAWRENCE RICE, Sr.
WILLIAM MARTIN JORDAN, Jr.